Nov. 29, 1955
R. R. CHAMBERLIN
2,724,985
WIRE STRIPPER
Filed June 3, 1953
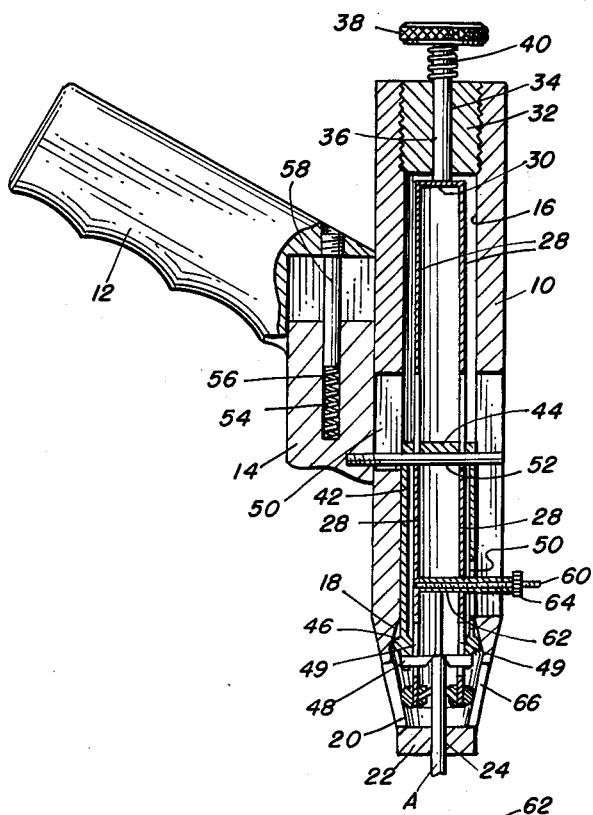
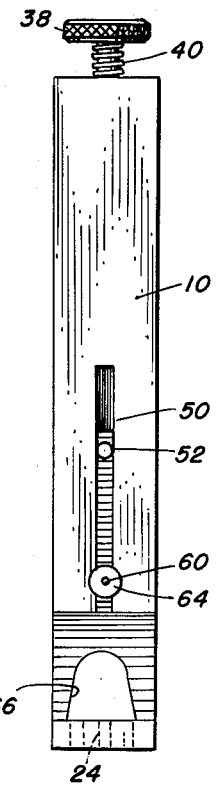
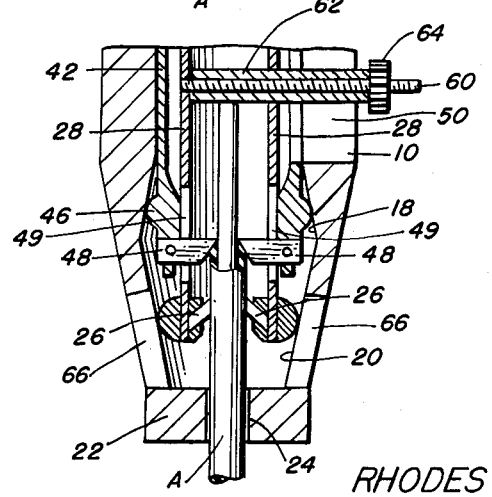
INVENTOR:
RHODES R. CHAMBERLIN
BY
ATT'YS

2,724,985
WIRE STRIPPER

Rhodes R. Chamberlin, Denver, Colo.

Application June 3, 1953, Serial No. 359,451

8 Claims. (Cl. 81—9.5)

(Granted under Title 35, U. S. Code (1952), sec. 266)

This invention relates to a tool for use by electrical workers in preparing insulated wires for making electrical connections with other wires or contacts.

In the old method a pair of pliers is used by opening the jaws and closing them about the insulation and pulling the pliers relative to the wire. The disadvantage of this method is that at least three inches of wire must be free in order to use the pliers; they cannot be used in a tight place; and it is difficult to obtain uniform stripping for the length of wire bared.

An important object of the present invention is to provide a stripper which may be operated by one hand on the syringe principle by first gripping the end of the wire to be stripped and then moving a member along the wire to remove the portion of the insulation therefrom.

A further object of the invention is to provide a wire stripper which requires only a short length of free wire so that the tool may be inserted into close places, such as corners and into a deep recess for removing the insulation.

A further object of the invention is to provide a wire stripper in which any number of wires may be stripped to a uniform bareness.

A still further object of the invention is to provide a wire stripper in the form of a pistol having a hand grip and a thumb-operated button for gripping the wire.

Other objects of the invention will appear in the specification and will be apparent from the accompanying drawings, in which:

Fig. 1 is a side elevation partly in section showing the invention;

Fig. 2 is an elevational view of the structure shown in Fig. 1; and

Fig. 3 is a sectional detail of the cutting blade depth gauge.

In this wire stripper a pistol-like tool has an opening for receiving the end of the wire to be stripped, and the wire is gripped at a distance from the end to be stripped by depressing an end thumb button. The end engaged and thus exposed is then engaged by a cutter to remove the insulation from the extremity of the wire inserted within the tool by pulling a trigger with the index finger.

Referring now more particularly to the drawings, a tool of the piston type has a barrel 10 with a grip portion 12 extending angularly therefrom and a trigger 14 connected to the grip near the barrel.

Within the barrel is a longitudinal bore 16 having an increasing tapered portion 18 near one end with a decreasing tapered portion 20 extending therefrom to the end which is closed by a cap 22. In this cap is a guide hole 24 in which an insulated wire A is inserted and from which the insulation is to be stripped.

Located within the bore and contacting the converging or decreasing tapered portion 20 are opposite jaws 26 which may be curved to conform somewhat to the outer periphery of the insulation of a wire A which is inserted through the opening in the cap 22 and secured to the jaws for supporting them is a frame 28 which may consist of opposite spring wires or narrow supporting metal spring strips extending toward the opposite end of the barrel where they are secured to a block 30. This block abuts a plug 32 threaded or otherwise secured in this end of the barrel and extending centrally through the plug is an opening 34. Attached to the block 30 and extending through the opening 34 and to the outside of the plug is a bar 36 having an engageable thumb piece 38 secured at the other end with a coil spring 40 surrounding the bar and interposed between the thumb piece and plug 32 tending to hold the frame 28 against the plug and in this position to maintain the jaws 26 against the inclined portion 20 in an open position. When the thumb piece 38 is pressed against the spring 40, the jaws 26 are forced against the outside insulation of a covered wire inserted through the opening 24.

Also slidably mounted within the barrel 10 is a cutter frame 42 having opposite spring sides connected by a cross piece 44 at one end having enlarged portions 46 for mounting inwardly extending cutters 48 in the other end. These enlarged portions are adapted to bear upon the outwardly tapered portion 18 at the inside of the barrel so that when the frame 42 is moved inwardly from the end in which the wire is inserted, the cutters 48 are moved inwardly to cut through the insulation of a wire and then by the sliding movement of the frame 42 to strip the insulation from the inserted end of the wire. The adjacent strips of the frame 28 are shown with slots 49 through which the cutters 48 are insertable in which they are slidable.

In order to move the stripping frame 42, there are opposite slots 50 in the barrel to receive a pin 52 therein which extends through the frame 42 adjacent the cross piece 44 and is threaded into one end of the trigger 14. The sliding movement of the trigger is opposed by a spring 54 located in a recess 56 within the trigger and opposed by a projection 58 from the handle or grip 12.

The amount of insulation removed from the wire will depend upon the setting of a depth gauge which comprises a bar 60 extending through one slot 50 and secured to one of the strips of the frame 28 at its opposite side with a sleeve 62 surrounding the bar and variously secured to the bar 60 by an attached thumb screw 64 which is threaded upon the outer end of the rod 60. By adjusting the sleeve 62 upon the bar 60, the movement toward each other of the opposite cutters 48 is limited so that the amount of insulation which is removed when the trigger is operated is determined by the setting of the screw 64.

Thus, both of the frames 28 and 42 are movable in the barrel, the gripping frame 42 being moved by the thumb piece 38 in one direction, and the cutting frame 42 being moved by the trigger 14 in the other direction. The movement of the frames in the barrel does not interfere with each other since they are made of wires or narrow strips which may be at right angles to each other transversely in the barrel or may have the slotted, intersecting and slidable relations as shown, and both of the frames are returned to their inoperative positions, the frame 28 by its spring 40 when the thumb grip 28 is released and the cutter frame 42 to its open position by the spring 54 when the trigger 14 is released.

In operation, an insulated wire is inserted through a guide hole 24 at the end of the wire stripper barrel which is held by one hand engaging the grip 12, with the index finger engaging the trigger 14, and the thumb engaging the thumb piece 38 at the end of the barrel. This leaves the other hand free to insert the wire to the desired extent. The thumb piece 38 is depressed by the thumb which forces the jaws 26 against the converging portion 20 thus closing the jaws tightly on the wire to hold it firmly in place. By then pulling the trigger 14, the cutters 48 are pressed inwardly by the enlarged portions 46 at the ends of the cutter frame spring sides 42 which engage the upwardly converging tapered portion 18 as the trigger is compressed. As the cutters are moved by the trigger into the barrel by means of the pin 52 connected to the cross piece 44 of the cutter stripping frame, the insulation on the wire is removed. Upon release of the trigger and the thumb piece, the wire A, usually held by the other hand, is pulled from the gun or pistol type of stripper.

When the insulation is stripped from a wire, it falls or may be discharged from the holes 66 on both sides of the barrel. The cutters may be replaced with new or different sized cutters, the cap has guide holes for wires of different sizes. The cutter spacings depend upon the actual size of the wire, and the guide holes depend upon the outside diameter of the insulation.

While a preferred embodiment has been described in some detail, it should be regarded as an example or embodiment of the invention and not as a restriction or limitation therein as many changes may be made in the construction and arrangement of the parts without departing from the spirit and scope of the invention.

The invention described herein may be manufactured and used by or for the Government of the United States of America for government purposes without payment of any royalties thereon and therefor.

I claim:

1. In a wire stripper, a tubular barrel having means forming a reduced opening at one end to receive therethrough the end of an insulated wire to be stripped, gripping jaws within the barrel to engage the outside of the wire insulation, cutting blades within the barrel movable toward the wire to engage the insulation, means for moving the cutting blades lengthwise of the wire toward the inserted end to strip the insulation therefrom comprising a frame having resilient parts in which the gripping jaws are mounted, the inner surface of the barrel opposite said parts converging toward the end of the barrel, and means connected to the frame at the other end of the barrel for pressing it endwise and thereby forcing the cutters inwardly when the said parts engage the converging portions.

2. In a wire stripper in accordance with claim 1, a frame movable within the resilient parts for mounting the cutting blades, the inside of the barrel having an outwardly flaring portion opposite said parts for mounting the cutting blades and said means for moving the cutting blade frame lengthwise of a wire in the barrel crossing the parts for mounting the cutting blades to engage the outwardly flaring portion of the barrel to move the cutting blades inwardly.

3. In a gun-type wire stripper, a tubular barrel having means forming a reduced opening at one end to receive therethrough the end of an insulated wire to be stripped, gripping jaws within the barrel movable to engage the outside of the wire insulation, cutting blades movable within the barrel to engage insulation on a wire, a mounting frame for the gripping jaws extending to the opposite end of the barrel, a push button connected to the frame at the outer end of the barrel for moving the frame, a hand grip extending angularly from the barrel and including a movable trigger, means connecting the trigger with the cutting blades within the barrel to move them to engage the insulation and relatively thereto to strip the insulation from a wire.

4. In a gun-type wire stripper in a tubular barrel having means forming a reduced opening at one end to receive therethrough the end of an insulated wire to be stripped, a hand grip projecting angularly from the barrel adjacent the end opposite the opening, gripping jaws within the barrel to engage the outside of the wire insulation, a mounting frame for the gripping jaws extending within the barrel toward the other end, a spring-opposed push button attached to the frame at the other end for moving the frame oppositely and the gripping jaws in engagement with the wire insulation at the other end of the barrel, cutting blades within the barrel and means to move them toward the wire to engage the insulation, a frame for mounting the cutting blades and moving them longitudinally in the barrel, a spring-opposed trigger mounted in the hand grip and having means attaching it to the frame for mounting the cutting blades, the movement of the trigger causing the cutting blades to move inwardly and longitudinally to engage the insulation and to remove the insulation from the end of an inserted wire when the trigger is operated against its spring.

5. In a wire stripper in accordance with claim 4, the hand grip projecting angularly near one end of the barrel and the push button projecting from the same end of the tubular barrel and in such a position that when some of the fingers of one hand are in engagement with the hand grip, the thumb is in a position to engage the push button, and the index or trigger finger is in a position to operate the trigger.

6. In a wire stripper, a tubular barrel having a reduced opening at one end to receive therethrough the end of an insulated wire to be stripped, gripping jaws within the barrel to engage the outside of the wire insulation, cutting blades within the barrel movable toward and from the wire to engage the insulation, means for moving the cutter blades lengthwise of the wire toward the inserted end to strip the insulation therefrom, the cutting blades having opposite resilient members of a supporting frame upon which they are mounted and a depth gauge adjustable between the said opposite mounting members for limiting the movement together of the said members of the supporting frame of the cutting blades and thereby limiting the depth of the cut of the insulation.

7. In a wire stripper, a tubular barrel having a reduced opening at one end to receive therethrough the end of the insulated wire to be stripped, gripping jaws within the barrel movable to engage the outside of the wire insulation, cutting blades within the barrel adjacent the gripping jaws, a frame having opposite resilient members for mounting the cutting blades slidably lengthwise within the barrel, a hand grip extending angularly from the barrel adjacent the end opposite the cutting blades, a spring-pressed trigger movable in the hand grip outside of the barrel, the barrel having opposite slots in its sides adjacent the cutting blade mounting frame and a pin connected to the trigger extending through the slots and engaging the cutting blade frame for moving the frame longitudinally toward the end of the wire inserted therein to strip the insulation therefrom.

8. In a wire stripper in accordance with claim 7, a depth gauge comprising parts connected to the opposite resilient mounting members and extending outwardly through one of said slots, an adjusting screw engaging said parts to limit their movement together within the barrel and the depth of engagement of the cutting blades as the cutter blade frame is moved in the barrel.

References Cited in the file of this patent

UNITED STATES PATENTS

| | | |
|---|---|---|
| 969,339 | Chytraus | Sept. 6, 1910 |
| 1,151,319 | Wood | Aug. 24, 1915 |
| 1,348,413 | Harrison | Aug. 3, 1920 |
| 1,566,297 | Williams | Dec. 22, 1925 |
| 2,120,398 | Edwards et al. | June 14, 1938 |